(12) United States Patent
Broderick

(10) Patent No.: US 9,574,678 B2
(45) Date of Patent: Feb. 21, 2017

(54) SELF-SEALING PRESSURE RELEASE APPARATUS AND PRODUCT TREATMENT SYSTEM INCORPORATING THE APPARATUS

(75) Inventor: Michael Broderick, Co. Carlow (IE)

(73) Assignee: ODENBERG ENGINEERING LIMITED, Dublin (IE)

( * ) Notice: Subject to any disclaimer, the term of this patent is extended or adjusted under 35 U.S.C. 154(b) by 487 days.

(21) Appl. No.: 12/875,319

(22) Filed: Sep. 3, 2010

(65) Prior Publication Data

US 2010/0326545 A1    Dec. 30, 2010

Related U.S. Application Data

(62) Division of application No. 10/541,903, filed as application No. PCT/IE2004/000003 on Jan. 12, 2004, now abandoned.

(30) Foreign Application Priority Data

Jan. 13, 2003 (IE) .................................. 2003/0015

(51) Int. Cl.
F16K 31/122 (2006.01)
A23N 7/00 (2006.01)

(52) U.S. Cl.
CPC ............ *F16K 31/122* (2013.01); *A23N 7/005* (2013.01); *Y10T 137/7876* (2015.04); *Y10T 137/794* (2015.04)

(58) Field of Classification Search
CPC . A23N 7/005; F16K 31/122; Y10T 137/7876; Y10T 137/794

USPC ............................................ 251/62, 63, 63.5
See application file for complete search history.

(56) References Cited

U.S. PATENT DOCUMENTS

| | | |
|---|---|---|
| 3,164,181 A | 1/1965 | Kunz |
| 3,658,092 A | 4/1972 | Walker et al. |
| 3,811,279 A | 5/1974 | Vogeli |
| 4,014,510 A | 3/1977 | Smith |
| 4,023,355 A | 5/1977 | McDonald |
| 4,044,834 A | 8/1977 | Perkins |
| 4,064,794 A | 12/1977 | Kunz |
| 4,589,627 A | 5/1986 | Grotloh |
| 5,078,177 A | 1/1992 | Tartaglia et al. |
| 6,302,136 B1 | 10/2001 | Weaver |

FOREIGN PATENT DOCUMENTS

| | | |
|---|---|---|
| EP | 0 431 702 A1 | 6/1991 |
| WO | 01/93704 A1 | 12/2001 |

*Primary Examiner* — William McCalister
(74) *Attorney, Agent, or Firm* — Rossi, Kimms & McDowell LLP

(57) ABSTRACT

A valve (61) for enabling release of pressurized steam from a pressure vessel has a displaceable closure member (67) which is maintained in its closed disposition by exposure to the pressure of the steam within the pressure vessel. The closure member (67) is displaced between its closed disposition and an open disposition by a double-acting actuator (69), suitably an air-driven piston/cylinder device, the closure member (67) being preferably mounted at one axial end of a spindle (68) extending between the closure member (67) and the actuator (69). The closure member (67) is suitably mounted for substantially metal-to-metal contact with a valve seat portion (63), without interposition of any sealing element, preferably for substantially vertical displacement between its closed and dispositions.

13 Claims, 8 Drawing Sheets

SELF-SEALING PRESSURE RELEASE APPARATUS AND PRODUCT TREATMENT SYSTEM INCORPORATING THE APPARATUS

This is a divisional of application Ser. No. 10/541,903 filed 12 Jul. 2005, which is a National Phase filed under 35 U.S.C. §371 of PCT/IE04/000003, filed 12 Jan. 2004, which claims priority to IE2003/0015, filed 13 Jan. 2003, the entire contents of which are incorporated herein by reference.

FIELD OF THE INVENTION

1. Background to the Invention

The field of the invention relates to the release of pressure, e.g., steam pressure, especially product processing systems, and in particular for systems for the processing or treatment of food products. More specifically, the field of the invention relates to steam peeling, especially steam peeling systems, more particularly steam peeling apparatus including a steam peeler pressure vessel. The present disclosure is specifically directed to pressure relief or reduction arrangements for steam exhaust from a steam peeler pressure vessel, as well as arrangements for environmental treatment of steam exhaust or discharge from a steam peeler pressure vessel.

2. Description of the Prior Art

Reference is made to Applicant's International Patent Application No. PCT/IE 01/00076, Publication No. WO0193704 (corresponds to USPGP 2003/0170364 and USPGP 2007/119312), in which there is described a pressure vessel for steam treatment of product to be peeled in a steam peeling system. The rotatable pressure vessel has substantially the shape of a sphere with opposed flattened side surfaces. Internal lifting features enable entraining and raising of product relative to the axis of the rotation of the pressure vessel during such rotation. Internal regions closed off against ingress of steam during product treatment define steam savers. A product treatment system incorporating the rotatable pressure vessel can also include a batcher for delivery of product to be peeled. There can be provision for accelerated pressure drop on completion of a peeling operation, as well as arrangements for minimizing release of entrained solid matter and/or odors in exhaust steam. Control features of the system enable unproductive displacement of the pressure vessel to be minimized.

In a known valve arrangement for controlling release of steam from a peeling pressure vessel on completion of a peeling operation, a balanced pressure valve is held closed against the steam pressure in a non-rotatable pressure vessel during the peeling operation. Discharge of the steam pressure is enabled by release of the biasing valve-closing force, so that the valve opening action is assisted by the force of the steam exiting from the pressure vessel.

BRIEF SUMMARY OF THE INVENTION

The present invention relates to a self-sealing pressure release apparatus and a product treatment system including the self-sealing pressure release apparatus.

The self-sealing pressure release apparatus can have a pressure vessel, a value assembly, and a double acting actuator. The valve assembly enables release of pressurized steam from the pressure vessel. The valve assembly has a displaceable closure member which, in its closed disposition, is maintained in the closed disposition only by exposure to the pressure of the steam within the pressure vessel. The double acting actuator displaces the closure member from the closed disposition to an open disposition against the pressure of the steam within the pressure vessel for the release of steam from the pressure vessel. The double-acting actuator can be an air-driven piston-cylinder device.

The apparatus can further include a spindle extending between the closure member and the actuator. The closure member can be mounted at one axial end of the spindle.

The valve assembly can further include a valve body having a metal valve seat portion. The closure member can have a metal contact part that contacts the metal valve seat portion for metal-to-metal contact with a valve seat portion, without interposition of any sealing element.

The apparatus can further include a face portion that is interchangeably secured to the closure member. The metal valve seat portion is interchangeably secured to the valve body and engages the face portion.

The closure member can be mounted for substantially vertical displacement between the closed disposition and the open disposition of the closure member.

The valve body can have a steam entry side and a stream exit side. Each of the stream entry and exit sides can have a flange. The nominal flange size of the valve body at the steam exit side can be substantially greater than the nominal flange size of the valve body at the steam entry side.

Another aspect of the present invention is a product treatment system that incorporates the self-sealing pressure release apparatus, with the valve assembly mounted for release of pressurized steam into an expansion region.

The product treatment system can include a solids trap, which is in communication with the expansion region to receive steam from the expansion region at a substantially reduced pressure in comparison with the steam pressure on initial entry into the expansion region, along with any entrained solid matter. The wherein the expansion region is configured to receive pressurized steam discharged from the pressure vessel at an end of a steam treatment phase of the product treatment via the self-sealing pressure release apparatus.

The solids trap can have a cyclonic configuration.

The system can further include an exhaust stack communicating between the solids trap and atmosphere. The stack can include noise reduction apparatus, which can comprise a stack region of enlarged cross-section transverse to the direction of exhaust flow. The enlarged cross-sectional region can comprise a plurality of spaced-apart perforated plates each disposed transversely to the direction of exhaust flow.

The pressure vessel can be rotatable, and the product treatment can be steam peeling.

BRIEF DESCRIPTION OF THE DRAWINGS

The disclosed embodiments will now be described with reference to the accompanying drawings, of which, FIGS. 1-4 and 8 correspond to FIGS. 7-9, 15, and 23 respectively of WO0193704.

FIG. 5 is a diagrammatic cross-sectional view of a known balanced pressure steam release valve arrangement for a steam peeling pressure vessel.

DETAILED DESCRIPTION

Figure 1:
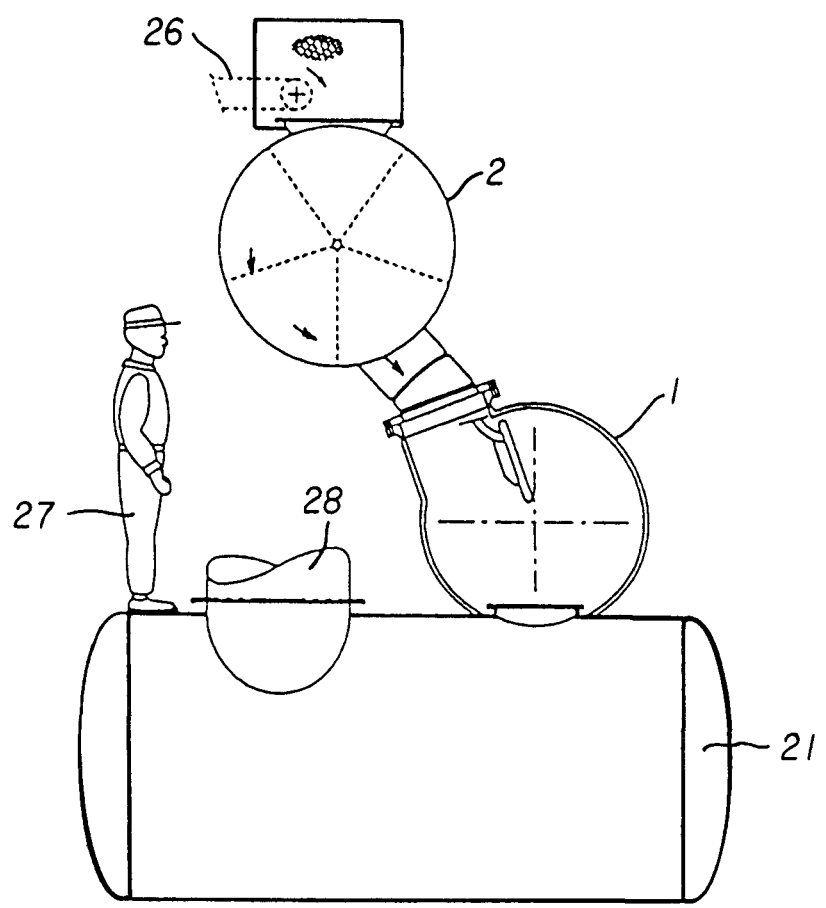
FIG. 1 is a side view of the rotatable steam peeling vessel and associated features of WO0193704.
Figure 2:
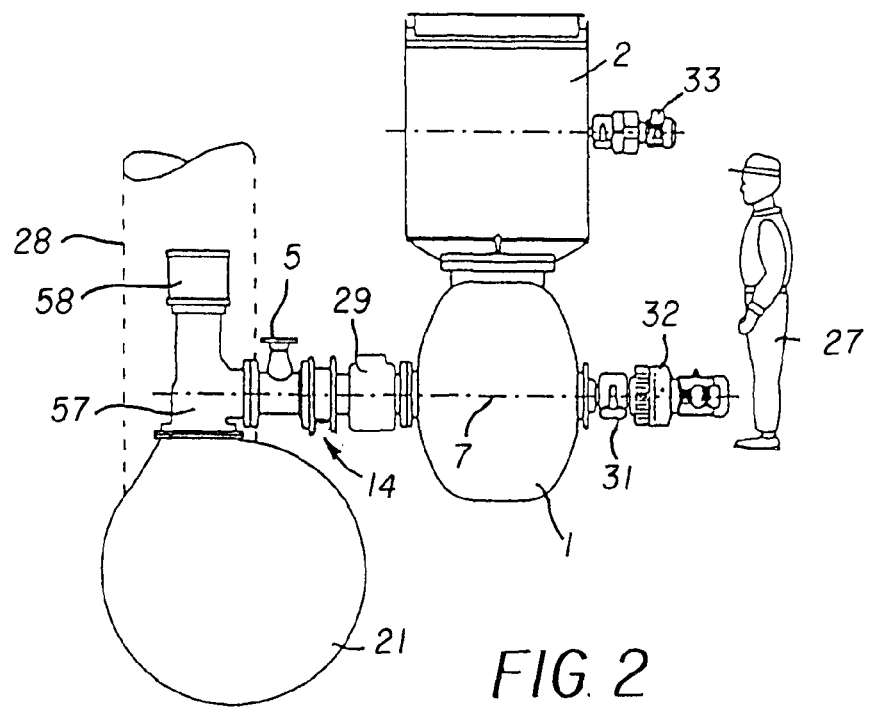
FIG. 2 is an end view from the right hand side of the arrangement of FIG. 1.
Figure 3:
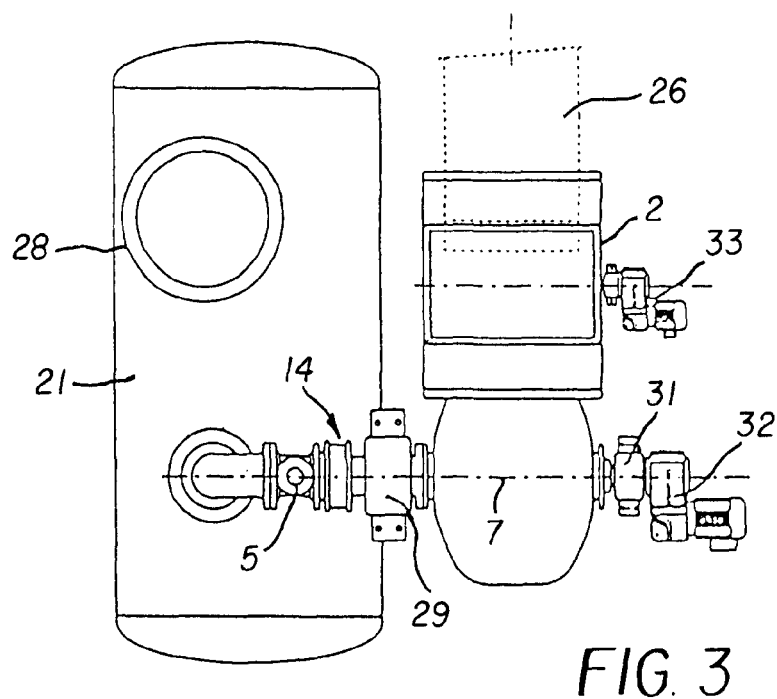
FIG. 3 is a top or plan view of the arrangement according to FIGS. 1 and 2.

FIGS. 1, 2 and 3 show the steam peeling system of WO01/93704. As shown in the side view of FIG. 1, a steam peeling vessel 1 is mounted for rotation about an axis 7 which extends substantially horizontally and perpendicular to the plane of the paper. The pressure vessel 1 is supported for rotation on a structure also providing operator access to the system, whenever required. Infeed to the pressure vessel 1 is provided by a conveyor belt 26 to a rotary batching unit 2, by which product is transferred from the infeed belt 26 to the pressure vessel 1 in measured quantities. The representation of a human FIG. 27 in FIGS. 1 and 2 is intended to indicate the scale of the system in this exemplary embodiment.

FIG. 2 shows the relative dispositions of the batching unit 2 and the pressure vessel 1, together with the relationship between the pressure vessel 1 and an expansion chamber or vessel 21 which is located to the rear of and below the pressure vessel 1 in terms of FIG. 1. As indicated in FIGS. 2 and 3, a large diameter stack 28 extends from the expansion chamber to a discharge location (not shown in these drawings) for waste or exhaust steam. The compact arrangement of the various units of the system can be noted, the assembled system defining an especially cohesive package occupying a reduced spatial volume as compared with prior art arrangements.

The top view of FIG. 3 shows the relative dispositions of these various features. In particular, as also shown in FIG. 2, the locations of bearings 29, 31 for the rotary pressure vessel 1 and also the disposition of a combined unitary steam admission and discharge line 14 between vessel 1 and expansion chamber 21 are particularly apparent. FIGS. 2 and 3 also show drive motor and drive gear arrangements 32 and 33 respectively for vessel 1 and batching unit 2 respectively.

Figure 4:
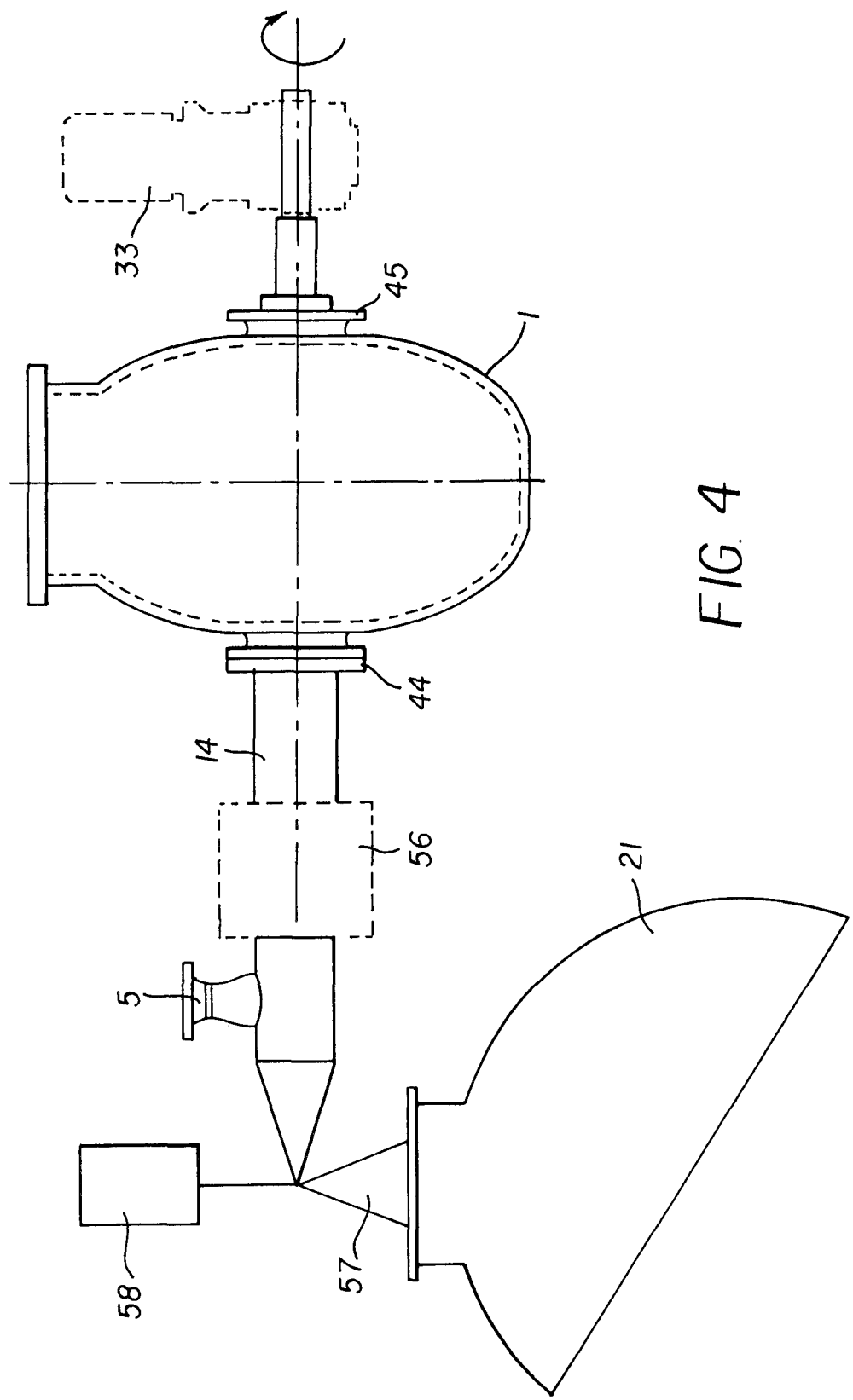
FIG. 4 is an end view of the rotatable steam peeling pressure vessel of WO0193704, showing rotary drive and steam feed and exhaust arrangements.

FIG. 4 shows the rotating mounting and steam discharge arrangements for the pressure vessel 1. On the right hand side of the pressure vessel 1, drive 33 is effected at a right-hand bearing mounting 45 (FIGS. 2 and 3) as shown in the drawing. On the left-hand side of the drawing, steam entry and exit is effected through a left-hand bearing mounting 44 and bearing 29 (FIGS. 2 and 3). Communication between the interior of the pressure vessel 1 and the single combined steam charging and discharge line 14 is effected through a rotary gland 56 with suitable packing. Thus steam admission and steam discharge takes place through a single steam port. There is only one steam port in the pressure vessel of the system, and this port serves alternately as an inlet port and an exhaust port. Steam is fed into the pressure vessel 1 through a charging line, not shown in the drawing, which communicates with line 14 by way of a suitable valve arrangement 5. Beyond the charging connection 5, in the direction away from the pressure vessel, the steam passage 14 from the pressure vessel 1 terminates at an expansion valve 57, which is mounted directly at and suitably on top of the expansion chamber 21 and defines a steam pressure release means of the system. In a specific construction for a rotatable steam peeling vessel, the valve 57 geometry provides for an inlet flange nominal diameter of substantially 10 inches and an outlet flange nominal diameter of substantially 12 inches. The size of the valve body is increased progressively between the entry and exit flanges to match this change (increase) in flange size as between the steam entry and exit locations, so that expansion of the steam conducted through valve 57 takes place in part through and within the actual body of valve 57. The increase in nominal flow area from valve inlet to valve outlet is thus of the order of 40%. The arrangement provides a spatial saving and can also be associated with a reduction in noise and flow turbulence at the point of entry into the expansion chamber 21, as well as a reduction in the number of components in the system and less back pressure. Valve 57 is suitably motor driven 58.

The 10 inch inlet flange diameter to the expansion valve 57 together with the provision of a comparable diameter and exhaust flow area at the flange of the single exhaust port 46 of vessel 1 represents a very substantial increase in the diameter and area of the steam exhaust port or passage from the vessel 1 as compared with the maximum values hitherto in general use for rotatable steam peelers of comparable capacity. Specific dimensional ratios between vessel 1 volume in liters and exhaust port area are quoted in WO0193704.

The expansion valve 57 is exposed to pressurized steam during peeling and opens directly into the expansion vessel 21 at the appropriate time. The use of as large an expansion chamber 21 as possible means that discharge directly to atmosphere is to a significant degree simulated. Environmental regulations generally prohibit or exclude the possibility of direct discharge to atmosphere. For this reason, it is necessary to interpose an expansion chamber 21. Nonetheless the desirability remains of achieving the maximum possible rate of pressure drop into the expansion chamber 21.

As shown schematically in FIG. 4, the expansion valve 57 is an elbow valve with the internal diameter of the flow passage increasing substantially in proportion to the change from a 10 inch nominal flange diameter at the input side to a 12 inch nominal flange diameter at the output or steam discharge side of the valve 57 adjoining the expansion or blowdown chamber 21. Proceeding along the steam line 14 from the 10 inch nominal flange size input side of the valve in the direction of the pressure vessel 1, there are provided in sequence, from the elbow valve 57 end, the steam admission control valve 5, the rotating steam gland 56 with balancing features (not shown), and a pipe section 14, which is of substantially 10 inches diameter in a specific embodiment and passes through the main bearing 29 (FIGS. 2 and 3), this large diameter pipe section 14 providing for both steam-in and exhaust.

There is thus substantially instantaneous reduction in pressure in the steam peeler vessel 1 when exhaust takes place. By substantially instantaneous is meant a pressure drop taking place within a time period which is typically less than 1 second. Mounting the exhaust valve 57 substantially directly on or at the decompression or expansion vessel 21 provides for substantial maximization of the possible or available pressure drop. The exhaust vessel 21 and expansion valve 57 are accordingly effectively combined, for optimization of the pressure drop. There is no lengthy separate duct communicating between expansion valve 57 and chamber 21. There is therefore effectively instant exhaust via the exhaust valve 57 and the very short steam exhaust path or line 14 from the peeling vessel 1 to the expansion vessel or chamber 21.

Figure 5:
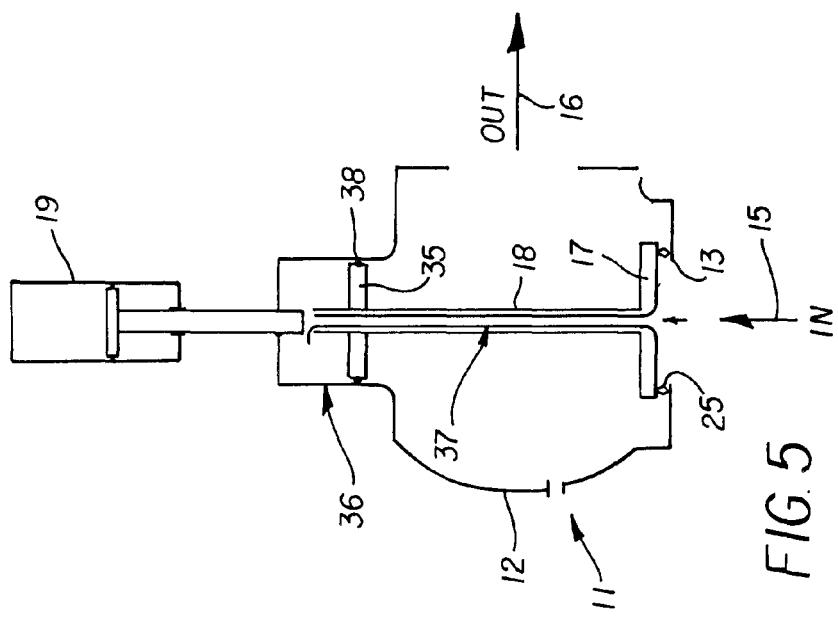
FIG. 5 illustrates a prior art pressure release valve, FIGS. 6 and 7 relate to an improved pressure release valve according to the present disclosure, FIGS. 9 and 10 relate to arrangements for and improvements in trapping or entraining solids and reducing odor in exhaust emissions. In particular.

FIG. 5 illustrates a prior art pressure release valve 11 for a non-rotatable steam peeler. The valve body 12 is again an elbow type structure, but one having steam entry 15 and exit 16 openings of the same nominal flange size and therefore, also substantially the same port area or flow diameter at both steam entry and at steam exit. There is no dimensional change in the valve body 12 as between the entry 15 and exit 16 flange regions. A valve closure element 17 is axially displaceable within the valve body 12 by means of an elongate valve spindle 18 which is actuated or driven between its closed and open dispositions by means of an air actuator or motor 19. When the static steam peeling pressure vessel is charged with steam, the valve element 17 is required to be held closed against the steam pressure at the entry port 15. A sealing member 25, e.g., of O-ring type configuration formed from a synthetic heat-resistant composition, is provided between valve element 17 and the valve seat 13 for element 17. To maintain the valve in the closed condition, a balanced pressure construction is provided, with the valve spindle 18 carrying, remote from the valve closure element 17, a piston 35 which is displaceable within and co-operates with a cylinder portion 36 of the valve body 12 to define a spatial region which is charged with steam from the pressure vessel via a central elongate bore 37 within the valve spindle 18. Thus, in the closed condition of the valve 11, the steam pressure within the pressure vessel is also active behind the valve piston 35, to define a balanced pressure arrangement. The valve 11 can be held closed against the steam pressure by the balanced pressure piston 35 being dimensioned such that it exerts sufficient closing force on the valve element 17. This is achieved by piston 35 being greater in diameter than the nominal area of element 17. With this arrangement, the steam pressure acting on piston 35 must be released in order to open valve 11 for steam exhaust.

In an alternative construction, there can be substantially exact balance between the closing force exerted by piston 35 and the opening pressure prevailing on the element 17. The valve can then be held closed by the air actuator 19. While the biasing pressure required of the air motor 19 to hold the valve 11 closed is modest, the air motor 19 is nonetheless required in this arrangement to be continually active to ensure that the valve 11 remains closed against the steam pressure. Despite the balanced pressure structure, reverse action of the air motor 19 is also required in order to actuate opening of the valve 11 for release of steam from the pressure vessel, along with simultaneous or prior release of the steam pressure on piston 35.

The arrangement is effective but suffers from a number of disadvantages, in particular relating to the necessity for regular maintenance. Preservation of appropriate sealing (seal 25) between the valve element 17 and the valve seat requires regular maintenance attention. If the air motor 19 is continually active, it is particularly subject to wear and tear, while the presence, within the valve body 12, of a balanced pressure cylinder 36, piston 35 and piston seal (reference 38), again represents a portion of the system requiring scheduled maintenance attention.

Figure 6:
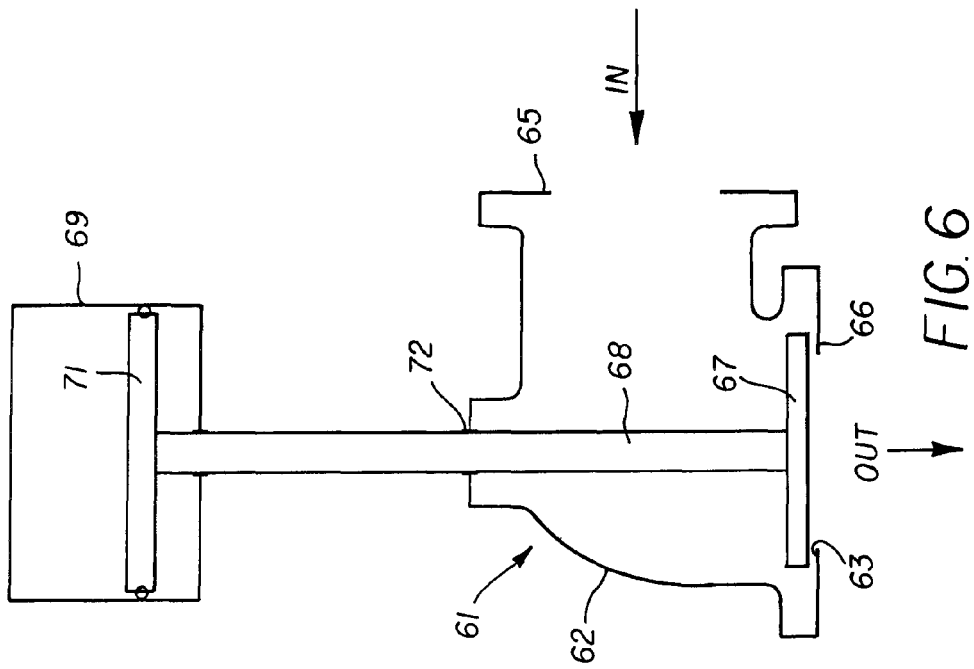
FIG. 6 is a diagrammatic cross-sectional view of the improved pressure release valve according to the present disclosure.

FIG. 6 shows an improved pressure release valve 61 provided by the present disclosure. The valve of FIG. 6 is particularly suitable for a rotatable vessel such as that of FIGS. 1-4, but is not limited to rotating peelers. It is also applicable to static peelers, and to static and displaceable steam pressure vessels in other product treatment systems, as well as being suitable for use in substantially any circumstances where a rapid reduction in steam pressure viz., substantial blowdown) is needed. The direction of flow through the valve 61 is reversed as compared with the prior art valve 11. Steam enters through a 10 inch input flange 65 and exits through the larger 12 inch flange discharge opening 66. The dimensions quoted correspond to nominal flange sizes for a particular embodiment suitable for rotary steam peeling. In other embodiments, different dimensions can apply with appropriate scaling up or down of the dimensions of the valve body to correspond to the mounting requirements. As compared with the prior art, the valve element 67 closes against the valve exit opening, which defines the valve seat 63. Thus in the charged condition of the steam peeler, the steam pressure is active to hold the valve element 67 closed. A particularly simple valve construction is thereby facilitated, in which a valve spindle 68 which does not require any internal steam passages links the valve closure element 67 directly to the drive piston 71 of an air motor or actuator 69. The air motor 69 is only required to be active to effect the valve opening operation. The sole other component of the valve 61 system subject to relative movement and potential wear is the sealing gland 72 through which the valve spindle 68 passes where it leaves the valve body 62 and extends to the air motor 69.

Thus, the valve 61 is self-sealing during pressurization and is held closed by the steam pressure. Metal-to-metal contact is provided between the valve seat 63 and the valve disk 67. This arrangement provides a self-cleaning effect at the valve seat 63. The air piston 71 is active for generally approximately 0.25 seconds to effect the valve opening action. While the valve element 67 requires to be displaced against the steam pressure, as compared with the pressure-assisted opening of the prior art, rapid movement of the element 67 against the pressure is readily achieved by suitable selection of the dimensions of the air motor 69, in particular piston 71 and cylinder diameter, and of the air pressures used. No difficulty has been experienced in experiments in opening the valve within the required brief time period, even against full steam pressure. Effectively the valve operates by brute force and does so in a fully successful manner.

Service experience has shown that any wear arising at the valve seat 13 is substantially uniform, this being attributed to uniform velocity of exiting steam around the full periphery of the valve element 67 during the expansion stage. This uniformity of flow also enhances the self-cleaning effect. Service experience has also shown that the gland packing 72 is almost maintenance free. In extended experimental use, no gland leakage was exhibited and only the most minimal adjustment was required. No replacement of the gland packing 72 was required over an extended period of experimental operation. The absence of gland wear is attributed to the substantially instantaneous pressure drop, which takes place in less than one second. Experimental investigations suggest that seat damage and gland damage in discharge valves for steam in which there is possible carry-over of solids are largely confined to the period when these solid residues pass through the valve. In the disclosed arrangement, such residues arrive only at the end of the discharge period when the pressure has already fallen significantly and the speed at which any residues impinge on valve surfaces and components is therefore diminished. Furthermore, the valve spindle 68 in the region which co-operates with the gland packing 72 when the valve is closed is not exposed to residue impact during the discharge period. When the valve 61 is pressurized, the valve components, including the spindle 68 and the valve-inward region of the gland packing 72 are exposed only to static pressure. Also, during this stage of the operation, the steam is clean. Thus damage due to solids carry-over cannot arise during the pressurization period.

Figure 7:
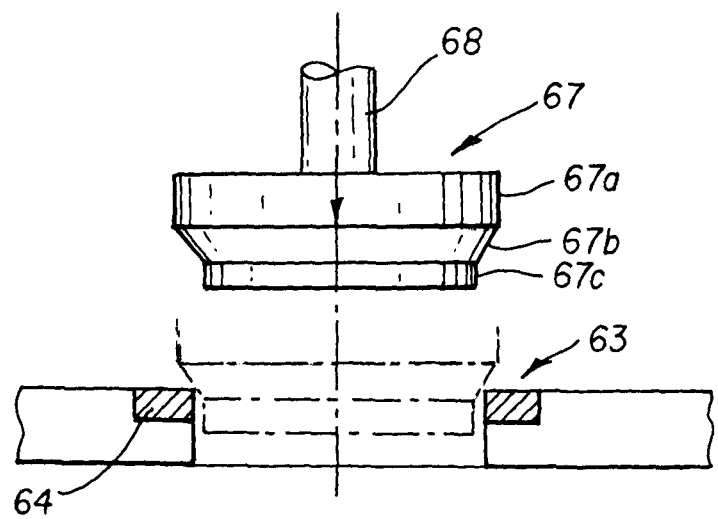
FIG. 7 is a detailed cross-sectional representation of the valve element and seat region of the valve unit of FIG. 6, with the valve element in the open disposition, shown in solid outline, and indicated in ghost in the closed disposition.

FIG. 7 shows greater detail of a particular embodiment of valve element 67 and co-operating valve seat 63. Prior art arrangements include bowl type elements, plug type elements and hemispherical closure elements. The structure shown in FIG. 7 provides a generally cylindrical upper valve closure element portion 67*a*, below which there is provided a frustroconical portion 67*b*, tapering inwards towards the free end of the valve element 67, this conical section 67*b* being followed in the exemplary embodiment by a final terminating cylindrical guide portion 67*c*. During closing movement of the valve element 67, this lead or guiding portion 67*c* enters into the valve exit aperture and steers the valve element 67 into effective sealing engagement with the seat region 63.

In the embodiment shown, the lower end of the valve element (cone 67*b* and lead face 67*c*) is provided to be replaceable. The seat 63 is also defined by a replaceable annular ring 65, both of these interchangeable elements suitably being bolt-on fittings. Differential hardness can be provided as between these components. The seat ring 64 can for example be significantly harder than the co-operating engaging lower region 67*b*, 67*c* of the valve element 67. An exemplary material suitable for this purpose is stellite, but a diversity of alternative substances can be employed. Differential hardness means that one material will wear more quickly than the other. Thus initial edge or line contact between the frustoconical lower part 67*b* of the valve element 67 and an initially sharply-defined edge region or corner of the seat 63, becomes modified with ongoing wear to a more extensive surface contact. However, the nature of this wear is such that good seating characteristics of the valve 61 will be maintained throughout its life. Any progressive wear is automatically compensated for by increased travel of the valve element 67, without any specific adjustment being required.

Thus, a particular point of novelty of the present disclosure in this specific embodiment is the use of replaceable elements for the valve trim, i.e. the combination of valve element 67 and seat 63. The demountability and ready replaceability of these parts of the pressure relief valve assembly 61 enables economy in maintenance to the extent that when limits of wear are ultimately reached, the active components of the valve 63 can be replaced without the necessity to replace either the complete valve body 62 or all of its moving parts, or to demount the valve body 62 for rectification work.

In the preferred arrangement shown in FIGS. 6 and 7, the valve 61 is mounted for vertical movement of the valve member. This provides for self-alignment in the opening and closing action, particularly the latter. Minimal air pressure is required to close the valve, as little as 5 PSI (pounds per square inch), or even less, given this particular advantageous orientation of the valve member 67. For a 3:1 ratio of air valve piston 71 to valve seat 63 diameter, the opening pressure can typically be 90-100 PSI, this being effective to overcome the typical 300 PSI steam pressure prevailing within a steam peeler in its active phase.

Thus, the present valve construction provides an operationally effective arrangement, which suffers only to the most minimal extent from carry-over of residues, and is proof against significant damage of any catastrophic nature even from those residues which are carried over. The valve can be applied to pressure relief in any product treatment system, whether using a static or displaceable (rotating) pressure vessel, and can be used with or without the particularly favored arrangement described above with reference to a specific embodiment, in which there is a dimensional increase between valve entry and exit. The valve can be deployed in arrangements in which a different dimensional relationship applies between steam entry and exit. It can also be applied to controlled release of steam pressure in any context, not necessarily limited to product treatment.

Figure 8:
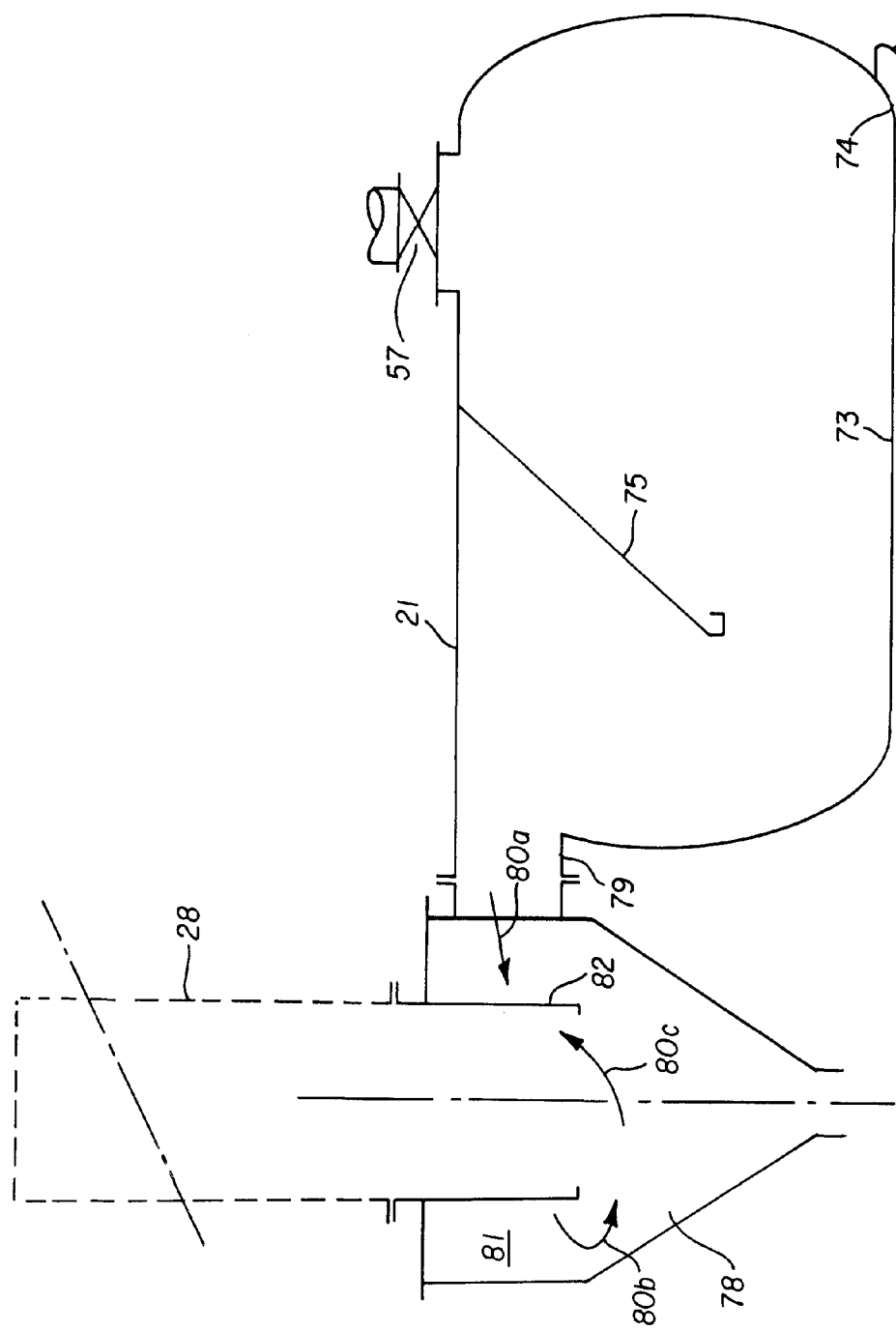
FIG. 8 shows an arrangement for solids entrainment in the exhaust features of the system of WO0193704.

FIG. 8 shows a particular embodiment of the expansion chamber 21 of the system of WO0193704. Steam enters the expansion chamber 21 at valve 57 from the steam peeler pressure vessel in the manner already described and the volume of the expansion chamber 21 is sufficient for very rapid reduction of pressure as the steam discharges into it.

Condensate accumulating on floor 73 collects at sump 74. Optional baffle 75 is located between the steam entry point and the discharge duct or stack 28. Baffle 75, where provided, extends downwards at an acute angle from the roof of the chamber 21 towards the stack 28 region of the chamber 21 in the direction of the exit point where steam leaves the chamber 21 and enters the stack 28.

The discharge stack 28 does not exit directly from the expansion chamber 21 proper, but rather from a solids trap 78, defined by a hopper-type structure communicating with the expansion chamber 21 by way of a duct 79 of large dimensions. The stack 28, again of large cross-sectional area, exits from an upper region 81 of this solids trap, but has a downwardly projecting flange or extension 82 extending in part into the solids trap 78, so that steam or vapor exiting from the expansion chamber 21 is required to follow a convoluted path from the upper steam entry region 81 of the solids trap 78 initially in a downwards direction, to turn around the edge of the downwardly projecting flange or extension 82 and then discharge upwards through the stack 28.

Figure 9:
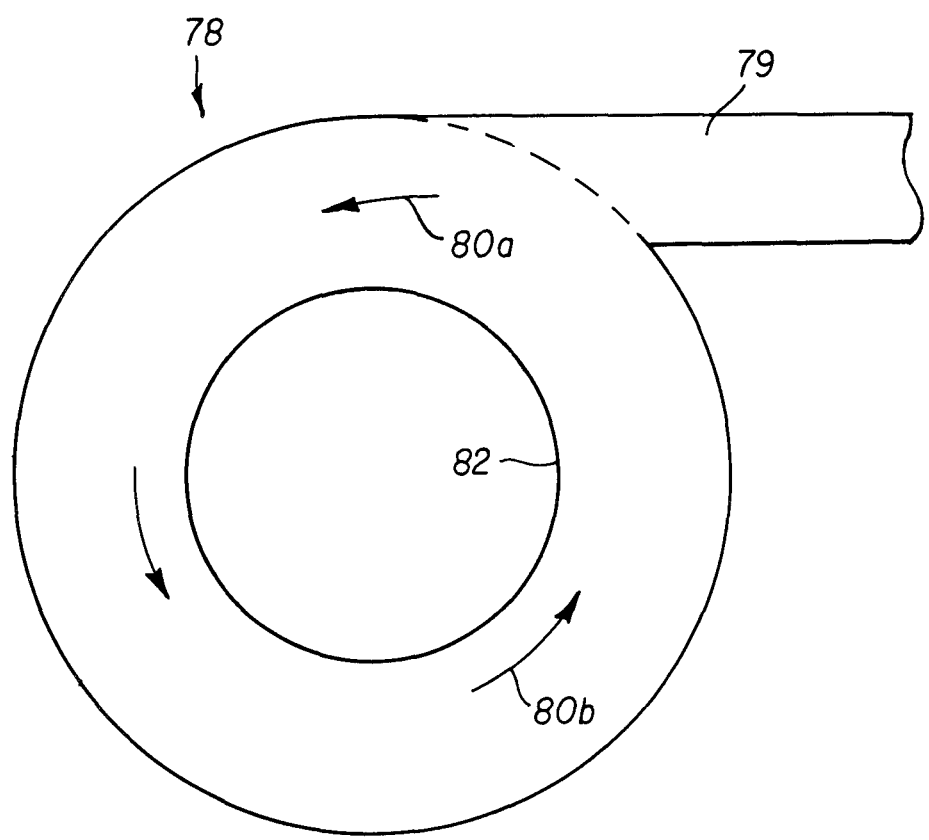
FIGS. 9 and 10 illustrate different arrangements for and improvements in trapping or entraining solids and reducing odor in exhaust emissions.

As shown more particularly in FIG. 9, the solids trap 78 functions as a cyclone, with the steam exit from chamber 21 positioned for tangential entry of the exhaust steam and entrained solids into the unit 78. The cyclonic swirling action within the trap 78 provides for particularly effective separation of solids from entrained steam, before final discharge of vapor through the stack 28 following the downward movement of the steam flow to turn under the lower edge of extension 82, at which location the majority of any carried-over solids fall to the base of the cyclone and are accumulated for collection or discharge.

The provision of an independent solids trap 78, operating entirely independently of the expansion vessel 21, has proven particularly effective. In the primary expansion tank 21, pressure typically drops from around 20 bar at entry to 0.15 bar gauge towards the exit point, in other words slightly above atmospheric.

This continuing positive pressure is sufficient to bring about effective solids removal in the second stage 78. The relatively low ongoing pressure of steam and residue reaching the separator 78 means that the solids velocity is then low enough for effective solids separation, such as by cyclonic action. Because of the relatively low velocity, but combined with adequate ongoing progressive movement, almost all solids are removed in the separator and there is minimal carry-over to the stack.

Single stage pressure reduction combined with solids removal is less effective, in that the steam velocity in such a combined operation can be excessive for satisfactory removal of solids. Thus, the low speed cyclone provided by the arrangement of the present disclosure is particularly effective in solids separation.

It is also possible for the solids removal unit 78 to be physically displaced to a location significantly removed from the location of the steam blow-down tank 21. Thus the pressure chamber 21 can be located within a factory building and the solids removal unit 78 located for example externally of the building. Duct 79 can therefore be substantially longer than the diagrammatic indication of FIG. 8.

Figure 10:
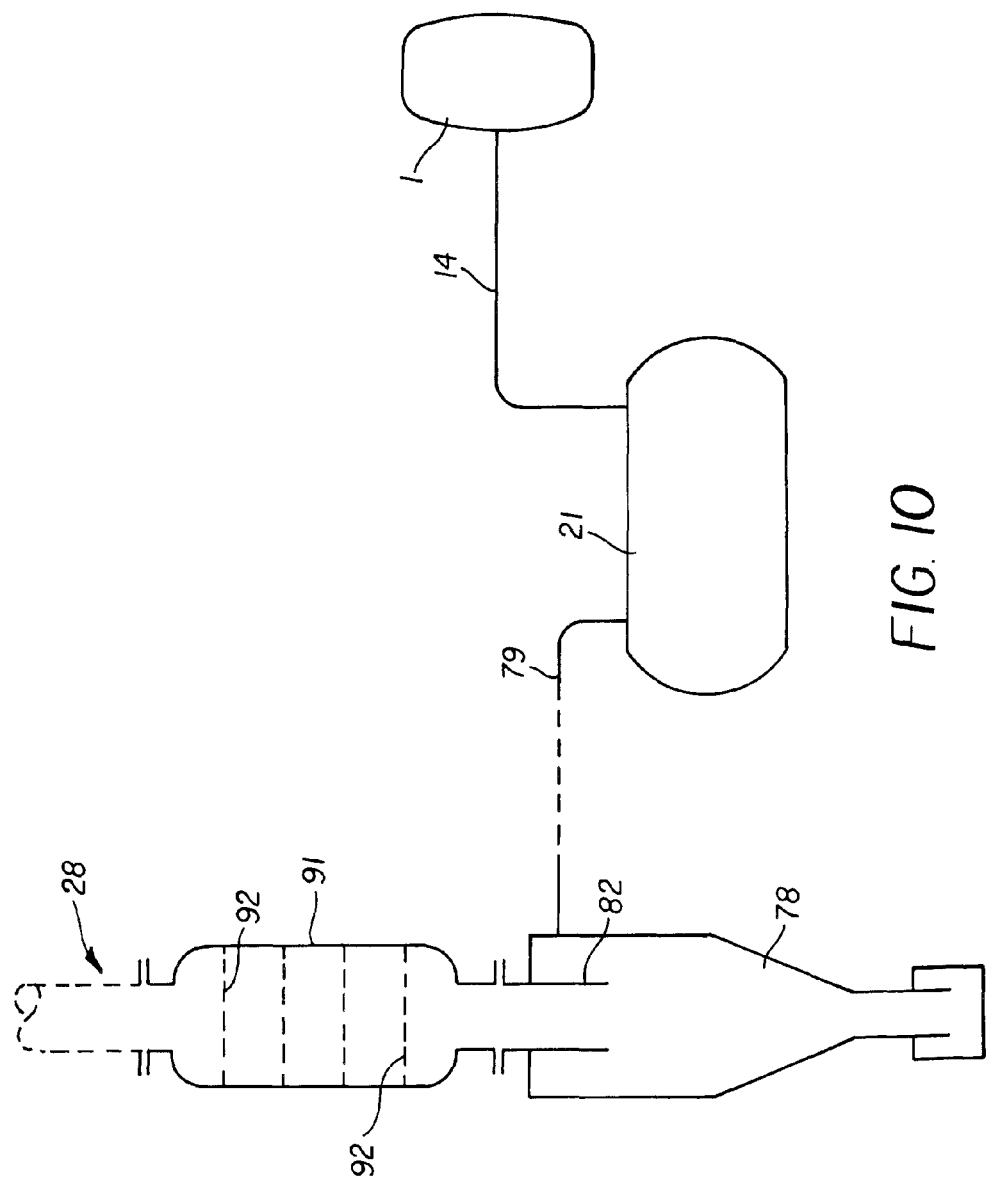

FIG. 10 illustrates such a possibility. The broken line 79 indicates the possibility of spacing the solids removal operation from the primary expansion tank. While FIG. 10 is primarily diagrammatic, it also shows an arrangement of tank 21 in which there is no baffle. Thus the baffle 75 represents merely an optional feature and not an essential integer of the expansion unit.

In a further aspect, FIG. 10 also illustrates a noise suppression chamber 91 which can be provided in the stack 28. For this purpose, the stack includes the noise suppression chamber 91, which is of enlarged diameter relative to the gas flow direction and has a cross-sectional area greater than that of the remainder of the stack 28. A spaced-apart series of perforated plates 92 is provided within this widened portion of the exhaust stack 28, suitably vertically disposed one above the other and transverse to the air flow direction. The arrangement produces effective noise suppression in an installation embodying the features of the present disclosure.

Other aspect of the present disclosure is directed to a valve for enabling release of pressurized steam from a pressure vessel, the valve comprising a displaceable closure member which, in its closed disposition, is maintained in the closed disposition by exposure to the pressure of the steam within the pressure vessel.

The closure member is displaceable between the closed disposition and an open disposition by a double-acting actuator. The double-acting actuator can comprise an air-driven piston/cylinder device. The closure member can be mounted at one axial end of a spindle extending between the closure member and the actuator. The valve body suitably comprises gland packing through which the spindle extends.

The valve member can be mounted for substantially metal-to-metal contact with a valve seat portion, without interposition of any sealing element. The closure member can have a face portion, which is interchangeably secured to the remainder of the closure member. The valve also can comprise a replaceable seat portion for engagement by the face portion of the closure member, the seat portion being likewise interchangeably secured to a valve body portion in the seat region.

The closure member is suitably mounted for substantially vertical displacement between the closed disposition and an open disposition thereof. In a particular construction of the valve, the nominal flange size of the valve body at the steam exit side is substantially greater than the nominal flange size of the valve body at the steam entry side. Thus, there is a commensurate increase in valve body size between the steam entry and exit locations with a corresponding enlargement of steam flow area through the valve, thereby providing an enhanced expansion effect for steam passing through the valve.

Another aspect of the present disclosure is directed to a product treatment system comprising a valve as specified above, wherein the valve is mounted for release of pressurized steam into an expansion region substantially at the point of entry of steam into the expansion region.

Another aspect of the present disclosure is a product treatment system comprising a pressure vessel, an expansion region for receiving pressurized steam discharged from the pressure vessel at the end of a steam treatment phase of the product treatment, and a solids trap, the solids trap being in communication with the expansion region to receive steam at a substantially reduced pressure as compared with the steam pressure on initial entry into the expansion region, along with any entrained solid matter.

The product treatment system according to this further aspect can also specifically comprise the aforementioned valve for enabling release of pressurized steam from the pressure vessel into the expansion region.

In the present product treatment system, the solids trap suitably acts in a cyclonic manner. The product treatment system can further comprise an exhaust stack communicating between the solids trap and atmosphere, the stack including noise reduction means. The noise reduction means can be defined by a stack region of enlarged cross-section transverse to the direction of exhaust flow, the enlarged cross-sectional region comprising a plurality of spaced-apart perforated plates each disposed transversely to the direction of exhaust flow.

In the present product treatment system, the pressure vessel for product treatment can be rotatable, but the features of the present disclosure, in particular the valve, are also applicable to non-rotatable or static pressure vessels, and also to pressure vessels for situations other than product treatment, where expedited but controlled release of pressure in required.

The product treatment system and the present valve are however especially suited to product treatments such as steam peeling.

What is claimed is:

1. A self-sealing pressure release apparatus comprising:
   a pressure vessel;
   a valve assembly having a valve body with an exit opening through which pressurized steam exits the valve body and a displaceable closure member displaceable between a pressure release position and a pressure seal position at which the closure member seals the exit opening; and
   a double acting actuator that displaces the closure member from the pressure seal position to the pressure release position against the pressure of steam in the pressure vessel to release pressurized steam from the pressure vessel,
   wherein the closure member is configured to release pressurized steam from the pressure vessel when the closure member is in the pressure release position,
   wherein the closure member is configured to seal pressurized steam in the pressure vessel when the closure member is in the pressure seal position,
   wherein the closure member is configured to be maintained in the pressure seal position by pressurized steam from the pressure vessel without actuating the double-acting actuator,
   wherein the double acting actuator has a spindle, wherein the closure member is mounted at one end of the spindle, wherein the closure member has a larger diameter than the spindle, and wherein the closure member at the pressure release position completely clears the exit opening of the valve body to allow instant exhausting of pressure from the pressure vessel through the valve body, and wherein the double acting actuator is only actuated to displace the closure member to the pressure release position.

2. The self-sealing pressure release apparatus according to claim 1, wherein the double-acting actuator comprises an air-driven piston-cylinder device.

3. The self-sealing pressure release apparatus according to claim 1, wherein:
   the valve body has a metal valve seat portion at the opening, and
   the closure member has a metal contact part that contacts the metal valve seat portion for metal-to-metal contact, without interposition of any sealing element.

4. The self-sealing pressure release apparatus according to claim 3, further comprising a face portion that is interchangeably secured to the closure member.

5. The self-sealing pressure release apparatus according to claim 4, wherein the metal valve seat portion is interchangeably secured to the valve body and engages the face portion.

6. The self-sealing pressure release apparatus according to claim 1, wherein the closure member is mounted for substantially vertical displacement between the pressure seal position and the pressure release position.

7. The self-sealing pressure release apparatus according to claim 1, wherein:
   the valve body has a steam entry side and a steam exit side,
   each of the steam entry side and the steam exit side has a flange,
   the nominal flange size of the valve body at the steam exit side is substantially greater than the nominal flange size of the valve body at the steam entry side, and
   the exit opening is at the steam exit side.

8. A product treatment system comprising:
   a self-sealing pressure release apparatus comprising:
   a pressure vessel;
   a valve assembly having a valve body with an exit opening through which pressurized steam exits the valve body and a displaceable closure member displaceable between a pressure release position and a pressure seal position at which the closure member seals the exit opening; and
   a double acting actuator that displaces the closure member from the pressure seal position to the pressure release position against the pressure of steam in the pressure vessel to release pressurized steam from the pressure vessel,
   wherein the closure member is configured to release pressurized steam from the pressure vessel when the closure member is in the pressure release position,
   wherein the closure member is configured to seal pressurized steam in the pressure vessel when the closure member is in the pressure seal position,
   wherein the closure member is configured to be maintained in the pressure seal position by pressurized steam from the pressure vessel without actuating the double-acting actuator,
   wherein the double acting actuator has a spindle,
   wherein the closure member is mounted at one end of the spindle,
   wherein the closure member has a larger diameter than the spindle, and
   wherein the closure member at the pressure release position completely clears the exit opening of the valve body to allow instant exhausting of pressure from the pressure vessel through the valve body,
   wherein the double acting actuator is only actuated to displace the closure member to the pressure release position, and
   wherein the valve assembly is mounted for release of pressurized steam into an expansion region.

9. The product treatment system according to claim 8, further comprising:
   a solids trap,
   wherein the solids trap is in communication with the expansion region to receive steam from the expansion region at a substantially reduced pressure in comparison with the steam pressure on initial entry into the expansion region, along with any entrained solid matter, and
   wherein the expansion region is configured to receive pressurized steam discharged from the pressure vessel at an end of a steam treatment phase of the product treatment via the self-sealing pressure release apparatus.

10. The product treatment system according to claim 9, wherein the solids trap has a cyclonic configuration.

11. The product treatment system according to claim 9, further comprising:
   an exhaust stack communicating between the solids trap and atmosphere,
   wherein the stack includes noise reduction apparatus.

12. The product treatment system according to claim 11, wherein:
   the noise reduction apparatus comprises a stack region of enlarged cross-section transverse to the direction of exhaust flow, and
   the enlarged cross-sectional region comprising a plurality of spaced-apart perforated plates each disposed transversely to the direction of exhaust flow.

13. The product treatment system according to claim 9, wherein:
   the pressure vessel is rotatable, and
   the product treatment comprises steam peeling.

* * * * *